Sept. 4, 1956 F. GOLLUB 2,761,216
POSITION INDICATOR-RECORDING INSTRUMENT
Filed Feb. 23, 1955
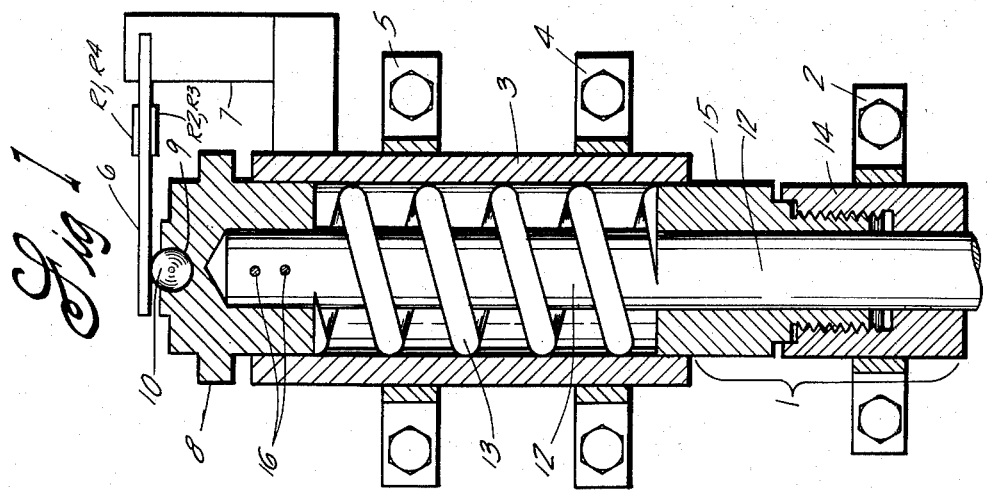
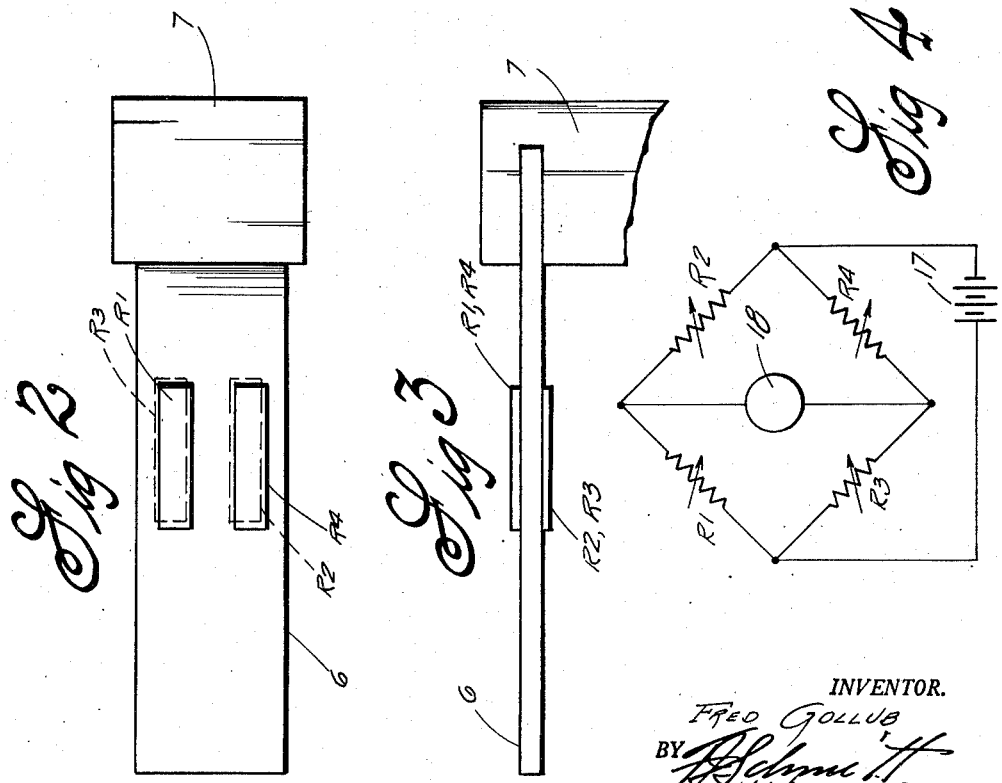
INVENTOR.
FRED GOLLUB

United States Patent Office 2,761,216
Patented Sept. 4, 1956

2,761,216

POSITION INDICATOR-RECORDING INSTRUMENT

Fred Gollub, Philadelphia, Pa.

Application February 23, 1955, Serial No. 490,160

1 Claim. (Cl. 33—147)

(Granted under Title 35, U. S. Code (1952), sec. 266)

The invention described herein may be manufactured and used by or for the Government of the United States of America for governmental purposes without a payment of any royalties thereon or therefor.

This invention relates to a linear position indicator and recording instrument for electrically measuring a change in linear position of structural members under test. The means generally available for making such determination have been found ot be inadequate, since said means are erratic, require amplification and are expensive to maintain.

Accordingly, it is an object of the present invention to provide improved means for measuring the linear position of an object under test.

A particular object of this invention is to provide an inexpensive means including strain gage means for recording changes in linear position of the movable portion of an aircraft landing gear under test.

Another object of this invention is to provide a linear position recording device which may utilize either alternating or direct current.

A further object of this invention is to provide a device for indicating the linear position of an object by translating a change in linear position of said object to a force proportional to said change, and then measuring said force to thereby measure the change in linear position.

The specific nature of this invention as well as other objects and advantages thereof will clearly appear from a description of a preferred embodiment as shown in the accompanying drawing in which:

Figure 1 is a diagrammatic view partially in cross-section of the mechanical translating means of the instant invention;

Figure 2 is a plan view of the cantilever beam of the present invention;

Figure 3 is a side elevation of the cantilever beam of the instant invention; and Figure 4 is a diagrammatic view of the recording means of the instant invention.

As shown in Figure 1, a longitudinally movable element 1 comprising an end portion 14 and a nut portion 15 is provided for initially sensing a change in position of a movable object. End portion 14 is fixed by means of clamp 2, or otherwise, to a movable object of an aircraft landing gear or other device under test. Hollow cylinder 3 is fixed by means of clamps 4 and 5, or otherwise, to another relatively movable object of a device under test, which in the preferred embodiment, may be the relatively stationary portion of an aircraft landing gear.

Cantilever beam 6 is fixed at one end to stationary cylinder 3 by means of an angle bracket 7.

A cylindrical guide plug 8 is formed so as to be slidable within one end of stationary cylinder 3. The upper portion of said guide plug is provided with a spherical recess 9 for receiving a ball bearing 10 for transmitting motion from said plug to cantiveler beam 6.

A spring 13, housed within cylinder 3, is provided for translating motion of movable element 1 to plug 8, and hence contilever beam 6. The compression of spring 13 may be adjusted by turning nut 15 which is screw threaded to member 14.

Guide rod 12 is provided for adequately guiding element 1 within housing 3. As shown in Figure 1, rod 12 is longitudinally fixed with respect to plug 8 by means of pins 16, or otherwise.

As shown in Figures 2 and 3, cantilever beam 6 is provided with four strain wire resistors $R_1$, $R_2$, $R_3$ and $R_4$. Resistors $R_1$ and $R_4$ are located adjacent to each on the upper surface of beam 6 and resistors $R_2$ and $R_3$ are located adjacent to each other on the lower side of cantilever beam 6.

As viewed in Figure 4, the electrical circuit includes battery 17, strain wire resistors $R_1$, $R_2$, $R_3$ and $R_4$, in a Wheatsone bridge circuit, and oscillograph 18. Resistors $R_2$ and $R_3$ which are physically located on the lower surface of beam 6 are located on two opposite arms of the Wheatstone bridge. Resistors $R_1$ and $R_4$ are located on the other two opposite arms of the Wheatstone bridge circuit. Potential source 17 is connected to the junction of resistors $R_2$ and $R_4$ and to the junction of resistors $R_1$ and $R_3$.

In operation, a change in position of movable element 1 with respect to cylinder 3 will cause spring 13 to be compressed and thereby transform the change in position to a compressive force which is proportional to said change in position. The force of spring 13 is then transmitted to cantilever beam 6 by means of ball bearing 10. The force exerted on beam 6 is then picked off by means of four variable resistors $R_1$, $R_2$, $R_3$ and $R_4$.

In practice, bending beam 6 upwardly stresses strain gages $R_2$ and $R_3$, to thereby increase the resistance of resistors $R_2$ and $R_3$, and compresses resistors $R_1$ and $R_4$ to thereby decrease the resistance of resistors $R_1$ and $R_4$, and electrical unbalance is produced, and oscillograph 18 senses said unbalance and records said unbalance or a function of time on a moving film.

Obviously many modifications and variations of the present invention are possible in the light of the above teachings. It is therefore to be understood that within the scope of the appended claim the invention may be practiced otherwise than as specifically described.

What is claimed is:

A position indicator for indicating the relative position of a pair of relatively movable members comprising a housing fixed to one of said members, a longitudinally bored movable element fixed to the other member of said pair of movable members, said longitudinally bored element including adjustable stop means positioned at one end thereof, a plug disposed at the upper end of said housing, a rod pinned to said plug passing through said housing and slidably received by the bore of said element, spring means surrounding said rod and disposed between said plug and said stop, a cantilever beam mounted on said housing and overlying the upper end of said plug, bearing means engaging the upper end of said plug and said beam, and strain gage means on said beam whereby linear motion of said element will deflect said beam and the bending strain in said beam indicated by said gage will be proportional to the relative linear movement of said members.

References Cited in the file of this patent

UNITED STATES PATENTS

| 2,477,026 | Wenk et al. | July 26, 1949 |
| 2,568,596 | Ruge | Sept. 18, 1951 |
| 2,581,264 | Levesque | Jan. 1, 1952 |
| 2,583,791 | Neff | Jan. 29, 1952 |
| 2,674,805 | Schaurte | Apr. 13, 1954 |